United States Patent [19]

Braun

[11] 4,229,613

[45] Oct. 21, 1980

[54] MONO-HOSE WITH ELECTRICAL CONDUCTORS AND END CONNECTOR MEANS

[75] Inventor: Siegfried V. Braun, Eschborn, Fed. Rep. of Germany

[73] Assignee: Gummi-Roller GmbH & Co., Eschborn, Fed. Rep. of Germany

[21] Appl. No.: 877,727

[22] Filed: Feb. 14, 1978

[30] Foreign Application Priority Data

May 4, 1977 [DE] Fed. Rep. of Germany ....... 2719851

[51] Int. Cl.³ .......................................... F16L 11/12
[52] U.S. Cl. ..................................... 174/47; 138/103; 138/109; 138/127; 138/137; 138/138; 174/74 R
[58] Field of Search .............. 174/47, 74 R, 126 CP, 174/128 R, 75 R, 77 R; 339/15, 16 R; 219/137.9; 138/103, 109, 118, 123–127, 129, 132, 133, 137, 138; 29/628

[56] References Cited

U.S. PATENT DOCUMENTS

| 3,127,227 | 3/1964 | Edwards | 339/15 |
| 3,211,823 | 10/1965 | Brown et al. | 174/47 |
| 3,641,658 | 2/1972 | Chevalier et al. | 174/47 X |

FOREIGN PATENT DOCUMENTS

| 2225060 | 12/1973 | Fed. Rep. of Germany | 174/47 |
| 2255957 | 4/1974 | Fed. Rep. of Germany | 174/47 |
| 2300627 | 7/1974 | Fed. Rep. of Germany | 174/47 |
| 2421128 | 11/1975 | Fed. Rep. of Germany | 174/47 |
| 304031 | 1/1929 | United Kingdom | 174/128 R |
| 704819 | 3/1954 | United Kingdom | 174/47 |

*Primary Examiner*—Laramie E. Askin
*Attorney, Agent, or Firm*—Schwartz, Jeffery, Schwaab, Mack, Blumenthal & Koch

[57] ABSTRACT

The invention relates to a hose of rubber or rubber-like elastic material adapted to convey pressurized medium and provided with a number of insulated, electrically conductive stranded metal wires embedded in the outer layer of the hose and contributing to its mechanical strength. Use of such a hose is desirable to transmit control signals or other electrical current from one end of the hose to the other by way of the stranded metal wires without obstructing the flexibility of the hose. An end connector means having a metal connector fitting, a shrunk-on sleeve in contact with the metal connector fitting, and a protective cover around the hose itself provides a means for joining the conducting hose to another flexible hose or suitable connecting member.

11 Claims, 4 Drawing Figures

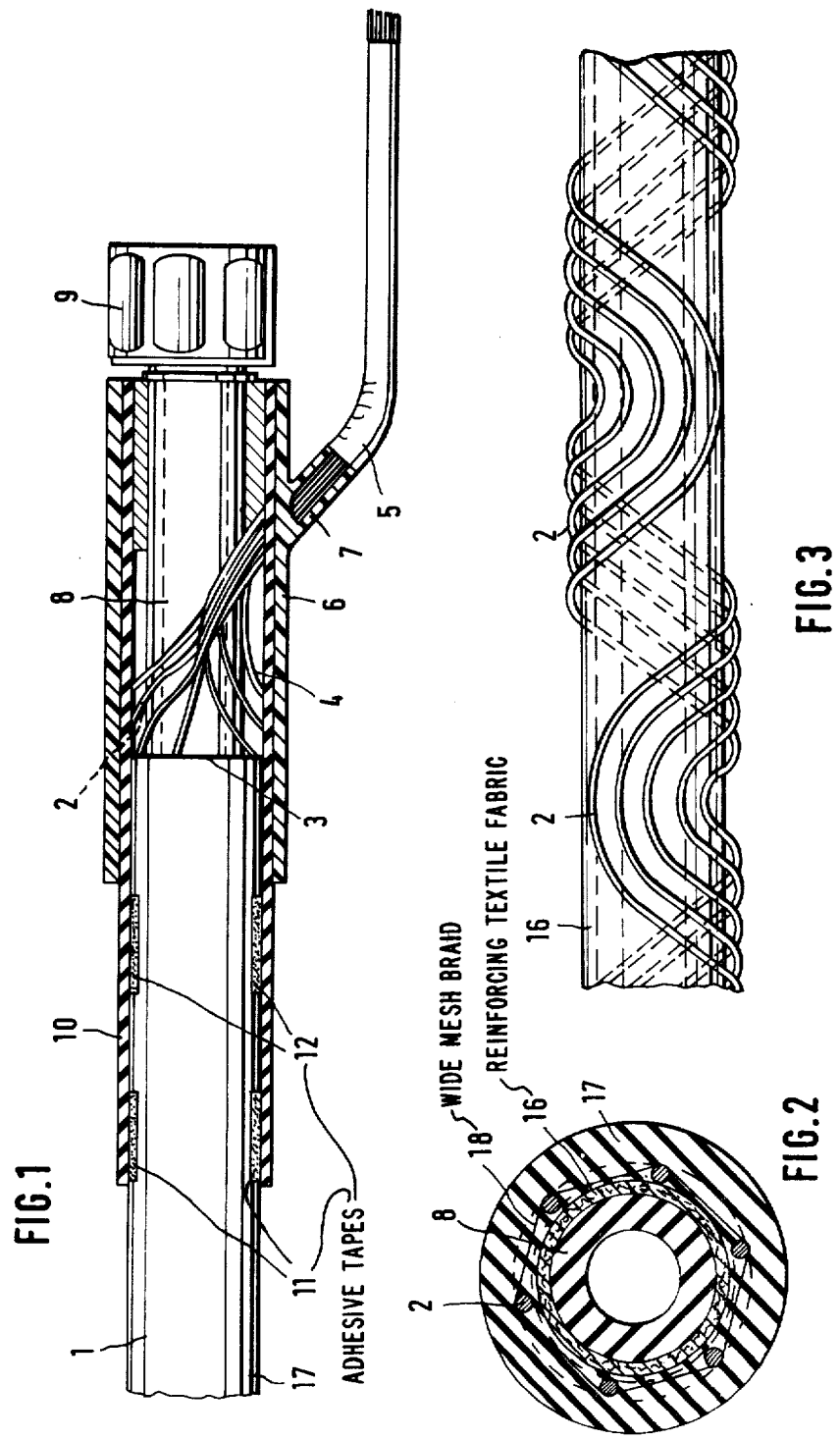

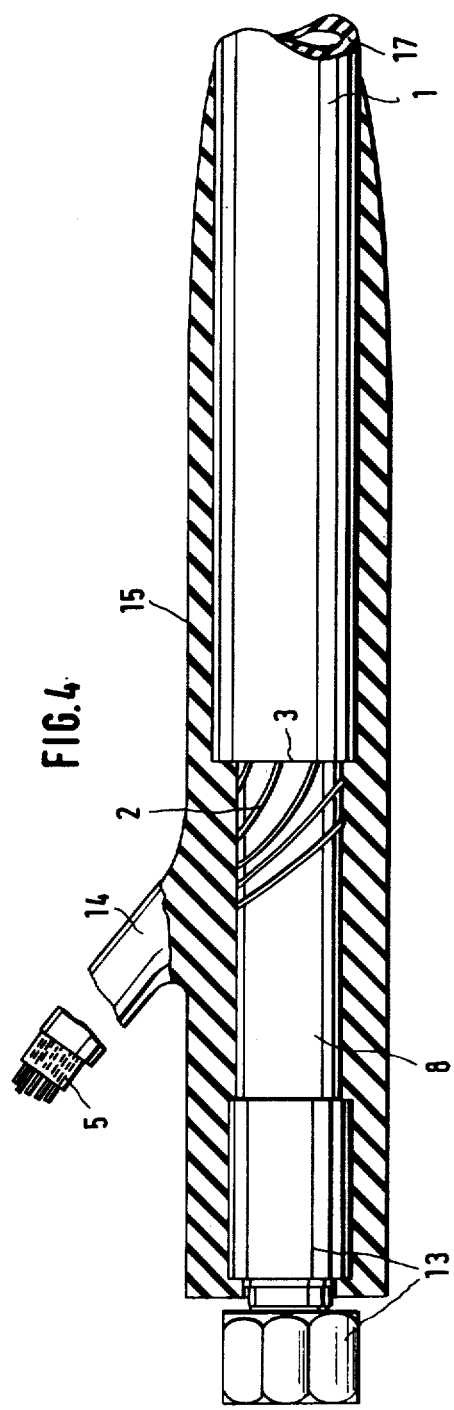

MONO-HOSE WITH ELECTRICAL CONDUCTORS AND END CONNECTOR MEANS

BACKGROUND OF THE INVENTION

The invention relates to a hose of rubber or of a rubber-like elastic material, in particular, such a hose for conveying a pressurized medium, and comprising several insulated, electrically conductive, stranded metal wires which are embedded in the outer layer of the hose, extend from one end of the hose to the other and contribute to the stability of the hose, where these stranded metal wires are formed as coils with a varying pitch direction from one turn to the next.

The invention also relates to a process for manufacturing an electrical wiring connection in combination with a hose consisting of rubber or a rubber-like elastic material and suited for conveying a pressurized medium, where this hose is provided with a number of separately insulated, electrically conductive, stranded metal wires which are embedded in the rubbery elastic outer layer of the hose.

Connecting hoses for supplying power to machines or tools are already known in the art which contain a pressurized medium and electrical conductors and their connectors. The electrical conductors are embedded in the rubbery elastic outer layer of the hose, in particular, on a fabric insert which is known per se.

In manufacturing such hoses, it is necessary to provide a special manufacturing process during which the electrical conductors are embedded integrally in the rubbery elastic outer layer of the hose. This not only causes increased production costs, but it also requires that this material be kept in stock with a corresponding further increase in costs.

This known connecting hose for supplying power to machines or tools is disclosed in the German published patent application (DT-OS) 2 225 060.

Accordingly, the invention has the objective to adapt a conventional hose, in particular a mono-hose, with stranded metal wires to increase the stability of the hose and so that it is suited for use in the electrical control of equipment connected to the hose.

A so-called "twin hose" is already known which comprises a reinforced hose of rubber or a rubber-like elastic material and is provided with a cable attached on the outside of the hose which has a number of separately insulated wires or stranded wires for electrical control purposes. Such hoses are used where it is necessary to convey fluids, especially fluids under high pressure, and to initiate electrical switching actions from the position where an ejection nozzle of the hose is used in order to control a remotely positioned pump unit or mixing unit for the fluid. For example, such hoses are used in high pressure washing installations consisting of a mobile pump unit with heater, heat exchanger, water tank, and tank for chemicals. The pressurized cleaning liquid is ejected from a nozzle connected to the end of the hose and the flow of the liquid to the nozzle is controlled by remotely controlling the pump unit and other units from a location in the vicinity of the nozzle by means of control signals conducted through the attached cable.

In such a twin-hose as described above, it is possible to disconnect the cable containing the electrical conductors at any desired position along the length of the hose. This twin-hose, however, results in an overall profile of the hose and the cable attached to it, which has a width larger than the hose diameter and, therefore, cannot be as easily handled as the round profile of a hose without such attached cable. Furthermore, additional special manufacturing procedures are necessary for joining the two hoses to form a "twin-hose".

SUMMARY OF THE INVENTION

Accordingly, the invention has the further objective of providing a device in which electrical control conductors are embedded in a hose with a round profile and can be electrically connected to a cable at any location along the length of the hose wherein this cable is separate from the hose.

In accordance with the invention, these objectives are achieved by providing a hose, where the stranded metal wires comprise separately insulated control leads, which extend from the hose in the form of a cable combining all of the control leads, and a connector fitting for the hose attached to the pressure hose member of the hose in the general vicinity where the stranded metal wires extend from the outer layer of hose material and combine to form the cable. Preferably, the stranded metal wires consist of copper-plated strands of steel wire. In a further advantageous embodiment, the stranded metal wires contain a copper wire as a core, and steel wire strands are woven around this copper core.

In a further embodiment of the invention the electrical insulation of each separate control lead comprises an insulating tubing consisting of a material cross-linked by radiation which has been shrunk onto the stranded wires of each control lead, wherein this insulating tubing starts at the location where the wires of the cable exit from the outer layer or embedding material of the hose. All control leads are covered with a layer of rubber and are combined into a cable leading out of the hose. Preferably, the rubber layer covering the control leads consists of a synthetic nitrile rubber.

In a further embodiment of the invention, all control leads combined are covered by a shrunk-on protective cover and are formed into a cable exiting from the material of the hose carrying the pressurized fluid. In accordance with the invention, a sleeve is formed by a shrinking process and covers the connector fitting, the cable formed by the combined, electrically insulated control leads extending from the outer layer of the hose and the end portion of said hose. Advantageously, a shaped part or protective cover is attached to the shrink sleeve on the outside and has a suitable length to cover at least a part of the connector fitting and the portion of the hose where the control leads exit from the outer layer of the hose. In accordance with the invention, this shaped part consists of a plastic material which can be shrunk onto the underlying parts.

In accordance with a further modification of the invention, a shaped part or protective cover consisting of rubber is provided over the connector fitting or part of the fitting, over the outside of the combined control leads in the region adjacent to the pressure hose member of the hose, and over the end of the hose, wherein a rubber-metal joint is provided with the connector fitting and a rubber-rubber joint is provided with the portions of the pressure hose member or with the shrink sleeve.

In accordance with the invention, a process is provided for manufacturing an electrical conductor connection in combination with a hose for conveying a pressurized fluid consisting of rubber or a rubber-like elastic material, and provided with a number of separately insulated stranded metal wires embedded in the material of the outer layer of the hose and contributing to the stability or mechanical strength of the hose itself. In accordance with the invention, this process comprises the following steps:

(a) At one end portion of a multilayered hose a ring of the outer layer is removed over an area circumscribing the hose. The ring has a relatively small width in the axial direction. It is located at a distance from the adjacent end of the hose corresponding to the desired length of the cable desired to be formed by combining said stranded metal wires. The outer layer is removed to a depth reaching down as far as the surface of the stranded metal wires embedded in the material of the outer layer of the hose, (b) The outer layer is further removed to a depth reaching down to the pressure hose member, so that the curved stranded metal wires are lying freely exposed on the pressure hose member, (c) The pressure hose member is cut off with an axial length of the cut-off portion corresponding to the desired free length of the cable to be formed by the combined free end portions of the stranded metal wires, (d) A high pressure connector fitting is attached to the end of the pressure hose member, and (e) The freed extending portions of the stranded metal wires are separately covered by the shrinking-on application of an insulating tubing of a material cross-linked by radiation converting the wires into individual control leads.

In a further embodiment of the process of the invention, the total number of the control leads which have already been separately electrically insulated by an insulating tubing and which extend from the embedding material of the outer layer of the hose are covered with a shrink part. First a shrink sleeve is shrunk over the connector fitting, the extending cable, and over the end portion of the pressure hose member, preferably over a total axial length of approximately 190 mm, and thereafter a shaped part of plastic material is applied preferably by heat shrinking for a water tight cover of the cable sheath consisting of the material cross-linked by radiation, and over the inner shrink sleeve. In a further embodiment of the invention, a shaped part consisting of rubber is vulcanized over the connector fitting, the extending control leads in the region of the pressure hose member, and over the end portion of the hose, so that a rubber-metal joint with the metal connector fitting and a rubber-rubber joint with the pressure hose member is achieved.

BRIEF DESCRIPTION OF THE DRAWINGS

A better understanding of the objects and the advantages of the hose and the process for its manufacture in accordance with the invention will be apparent from the following detailed description, by way of example, of some embodiments in conjunction with the drawings, which show:

FIG. 1—a longitudinal section of a mono-hose with freely extending stranded metal wires and electrical control leads and a shrunk-on shaped part on the end portion of the hose, FIG. 2—a transverse cross-section through an alternate form of a hose with embedded stranded metal wires or electrical control leads, additionally having a reinforcing fabric covering the hose member for the pressurized medium, FIG. 3—a longitudinal cross-section of a hose with the outer layer removed, and FIG. 4—a longitudinal cross-section through a monohose with freely extending stranded metal wires or electrical control leads, which is provided with a rubber shaped part and a steel connector fitting.

DESCRIPTION OF THE PREFERRED EMBODIMENTS

In FIG. 1 a mono-hose is designated by reference number 1 and is provided with separately and mutually insulated stranded metal wires 2 which are embedded in the outer layer of the hose and are arranged along a curved path within the outer layer of the hose. Stranded metal wires 2 exit from the outer layer of hose 1 at 3 and, starting from that location 3, the separate stranded metal wires 2 are individually provided with an electrical insulation 4 to form electrical control leads which are led out through shrink shaped part 6 in the form of a cable 5. Shrunk-on shaped protective cover or part 6 is formed into an additional protective cover or cable sheath 7 in the region where the cable 5 exits from the outer layer of the hose, in order to form a reinforcing portion at the cable exit and to achieve a protection against the breaking-off or tearing-out of cable 5 and, additionally, to provide a protection against moisture penetration into the hose.

A metal connector fitting 9 is secured to the end of hose member 8. Hose member 8 is arranged to house a pressurized medium and maintain it separated from stranded metal wires 2. Connector fitting 9 is pressed into the end of hose member 8 and is joined to the shrink shaped part 6.

Stranded metal wires 2 are embedded within the outer layer of the hose over the length of the mono-hose in a curved configuration, for example, in a sinusoidal configuration, in order to prevent a breaking of the relatively thin strands of metal wire during a bending of the hose during use. Stranded metal wires 2 may advantageously consist of a copper core having steel wires woven or stranded around it, so that the electrical conductivity of the stranded steel wires is improved by the copper core without impairing the mechanical breaking strength. Because of this, it is easily possible to additionally utilize stranded steel wires, which primarily serve to increase the mechanical stability or bursting strength of the hose as electrical conductors, particularly for low control currents. Accordingly, the length of hose normally used and, therefore, the distance to be bridged by these conductors, is relatively small, in the order of 10 to 30 meters, so that the conductivity achieved by the above-described arrangement of stranded steel wires forming the control leads will be sufficient for most control applications.

Alternatively, an arrangement of stranded metal wires for use as control leads could consist of stranded steel wires without the above-described copper core wire, wherein the strands of steel wire would be copper-plated for increased conductivity. Depending on the conductivity required by a particular application and on cost considerations, stranded steel wires without copper-plating could also be used.

In the embodiment shown in FIG. 1, a shrink sleeve 10 is provided immediately above the freed stranded metal wires 2 and extends over a certain length along mono-hose 1 and is bonded to mono-hose 1 by adhesive means 11 and 12, e.g. adhesive tapes. Adjacent to its end portion, hose member 8 may be covered by a tape, e.g. an adhesive tape similar to the adhesive means 11 and 12. During the heat-shrinking process, the surface of shrink sleeve 10 conforms closely to its supporting surface of the underlying parts, so that the underlying portions of stranded metal wires 2 which have been removed from their embedding rubbery material of hose 1 and are freely exposed on hose member 8 are in close contact with this member.

As already mentioned above, part 6 is applied by heat shrinking it over sleeve 10 in the region of the outer end of hose member 8 and extending beyond the location 3, where the control leads exit from hose 1, and is firmly joined to the steel connector fitting 9 at the outer end of hose member 8.

DESCRIPTION OF A PREFERRED PROCESS OF MANUFACTURE

The manufacture of the combined cable and hose connection according to the invention is carried out in the following manner.

At one end portion of hose 1 a ring of the material of the outer layer of mono-hose 1 is removed over an area circumscribing the hose, where this ring has a relatively small width in the axial direction, e.g. a width of about 10 to 15 mm, this area being located at a distance from the adjacent end of hose 1 corresponding to the desired free length of the cable to be formed by combining the end portions of the stranded metal wires after they have been removed from the embedding material of the outer layer of the hose. Enough of the outer layer of the material of hose 1 is removed from the area of the ring to make the stranded metal wires visible.

A preferred method of removing the outer layer is to apply a rotating steel wire brush to this area of hose 1. However, other mechanical means can also be used, e.g. a grinding wheel or a cutting tool.

The ring of removed material of the outer layer obtained in the above-described manner accurately marks the area 3 where the end portions of the stranded metal wires exit from the outer layer of hose 1, as has been more fully described in connection with FIG. 1.

Now, the material of the outer layer of hose 1 is removed over the remaining distance between the above ring and the end of the hose, to a depth reaching down as far as the surface of the embedded stranded metal wires. Again a revolving steel wire brush may be used or a grinding wheel or a suitable cutting tool. During this operation, care is to be taken to avoid a damaging of strands of the stranded metal wires while removing the overlying material of the hose.

Subsequently, the outer rubber layer of hose 1 which still remains between the stranded metal wires and the outer surface of the inner hose member 8 for the pressurized medium is removed down to the surface of hose member 8, so that the end portions of the stranded metal wires are freely exposed on pressure hose member 8. As already indicated above, the outer rubber layer of hose 1 is removed over an axial length of the hose corresponding to the desired length of the control cable which is to be made up from these exposed portions of the stranded metal wires.

Since usually control cable 5 is longer than the end portion of the pressure hose member 8 to which the connector fitting 9 is secured, a portion of pressure hose member 8, from which the stranded metal wires have been freed, as described above, is now cut off.

Now, the high pressure connector fitting 9 is attached to the end of pressure hose member 8. Any suitable connector fitting adapted for the intended use of the finished hose can be used and the fitting can be attached to the end of hose member 8 in any conventional manner suited for that particular fitting used.

An insulating tubing consisting of a material cross-linked by radiation is then applied by a shrinking process over each of the exposed portions of stranded metal wires in order to obtain separately insulated control leads which may then be combined to form control cable 5. While such insulating tubing consisting of a material cross-linked by radiation is preferred because of its exceptional and advantageous properties with respect to electrical insulation and shrinking, an insulating tubing of other conventional shrinkable and insulating material could also be used.

The above-described process of manufacture results in a mono-hose in which electrical conductors are embedded in a hose with a round profile and at one end of the hose control leads are separately brought out and are connected with the embedded electrical conductors, thus utilizing them to transmit control signals to the other end of the hose. Normally, this process would be repeated at such other end of the hose, if the same facilities for electrical connection and connection of the pressure hose member are desired for such other end.

With reference to FIG. 1, further process steps will now be described which can be used to obtain further embodiments of the invention.

While for many applications the separately insulated control leads obtained by the above process will be sufficient, for some applications it is preferred to combine these control leads into a cable.

Therefore, in an additional process step, the combined control leads obtained by the above process are enclosed in a rubber sheath or protective cover and formed into a cable extending from the hose.

Preferably, in this process step the rubber material used is a synthetic nitrile rubber.

In an alternative embodiment of this process step the combined control leads obtained by the above process are covered by a part applied by shrinking techniques and are formed into a cable extending from the hose member for the pressurized medium.

Subsequent to the above-described process for obtaining a mono-hose with extending control leads or either one of the additional steps for obtaining a cable from the combined control leads, the following additional optional process steps may be carried out, each leading to a product which may be used as is or be subjected to the following process steps.

Adhesive means 11 and 12, e.g. adhesive tapes, are applied around hose 1 in the vicinity of the area 3 where the control leads exit from the outer layer of the hose. Optionally, a further adhesive means may be attached over the end portion of exposed hose member 8 for the pressurized medium. Adhesive means can be an adhesive tape and may have a larger thickness than adhesive means 11 and 12. A shrink sleeve 10, which at least extends from adhesive means 11 to the end of hose member 8 for the pressurized medium, is then applied on the outside and joined to the underlying parts, especially to the exposed portion of the hose member 8, by means of shrinking. For example, the total length of this sleeve 10 may be 190 mm. This sleeve can also cover at least an adjacent portion of connector fitting 9.

Subsequently, a shaped part or protective cover 6 is applied so that it covers at least connector fitting 9 and the area where the control leads exit from the outer layer of hose 1. In a preferred embodiment, this shaped part 6 consists of a shrinkable plastic material and is shrunk onto shrink sleeve 10. At the same time, a sleeve or collar is formed around part of control cable 5 in the region adjacent to its location of exit from hose member 8 and sleeve 10. This sleeve or collar around control cable 5 is an integral part of shrink shaped part 6. Furthermore, shrink shaped part 6 is attached to the outer portion of inserted metal connector fitting 9, so that a firm seating for this fitting is obtained.

In a preferred embodiment shaped part 6 is shrunk over the underlying parts to give a water tight seal.

Cable 5 leading from hose 1 and comprising the control leads is freed from the insulation at its end in a conventional manner and is provided with corresponding electrical connections, e.g. with plug contacts or with a combining instrument plug which is provided with a corresponding number of contacts in accordance with the desired control function and the number of available control leads.

FIG. 2 shows a transverse cross-section of an alternate form of a hose which is particularly suited for carrying out the invention. As essential components, the hose comprises a pressure hose member 8 in the form of a pressure resistant flexible conduit which is in immediate contact with a reinforcing fabric 16, preferably consisting of a textile fabric. The outer layer or envelope 17 and pressure hose member 8 preferably consist of rubber. However, in accordance with the requirements of a specific application, different rubber compositions can be chosen for pressure hose member 8 depending on the different properties desired such as the chemical resistance against the medium conveyed by the hose member. For outer layer 17, a rubber composition can be chosen which primarily is resistant to the mechanical stresses and which has the necessary resistance to wear or abrasion. The required bursting or blowout strength is determined by the type of reinforcing fabric 16 used and by the properties and the interconnection of the fibers used for the fabric. On the other hand, the stranded metal wires 2 are provided with an insulated sheath and extend over the whole length of the hose, as can be seen from FIG. 3. Furthermore, FIG. 3 shows that the stranded metal wires 2 are arranged adjacent the hose member with an axial spacing from one stranded metal wire to the adjacent wires and in the form of coils, wherein the direction of the pitch (slope) varies from one turn to the next, so that a loop pattern is developed. In order to fix the stranded metal wires, especially during the manufacturing process of the hose, these wires are surrounded by a wide mesh braided material 18, giving little or no contribution to the retaining strength of the interior pressure member of the hose. The number of strands of metal wires to be embedded in the outer layer is determined by the intended preferred use of the hose.

Because of their special arrangement in the layer, the metal wire strands are able to follow all changes in the form or movement of the hose, such as the influence of exterior forces or of the inner pressure, expansion of the cross-section of the hose, and also elongation, compression or twisting of the hose without suffering damage from the resultant stresses. Since the stranded metal wires 2 do not circumscribe hose member 8 in the form of the turns of a coil, they can balance or compensate the stresses developed by the above-mentioned changes in the form of the hose by yielding elastically to those changes with respect to their position and their angular arrangement within the walls of the hose. Therefore, breaks and other damages to these stranded metal wires during the use of the hose are practically eliminated and the conductivity of the stranded metal wires for the electrical control currents is maintained over the whole lifetime of the hose, even under extreme environmental conditions and usage. Because of this, the particular arrangement of stranded metal wires 2 on pressure hose member 8 is particularly suitable for carrying out the invention. This arrangement of the stranded metal wires can also be used in connection with a mono-hose 1 as shown in FIG. 1, which does not contain the reinforcing fabric 16 as shown in FIG. 2.

In using the hose as shown in FIG. 2 instead of the hose shown in FIG. 1, the process used and the hose obtained differ somewhat from the process and product as described above in connection with FIG. 1. This difference is due to the fact that in the preparation of the end portion or end portions of the hose to obtain the freely exposed control leads or control cable, the layer or reinforcing fabric 16 surrounding pressure hose member 8 is left intact. Therefore, after first removing the material of outer layer 17 down to the surface of embedded stranded metal wires 2 over an annular area circumscribing hose 1, as in the process described in connection with FIG. 1, the embedding material of outer layer 17 of the hose is removed over the remaining portion between the above annular area and the end of the hose, to a depth reaching down as far as the surface of the stranded metal wires embedded in the material of outer layer 17 of the hose, again similar to the process and product described in connection with FIG. 1. However, now the material of outer rubber layer 17 of the hose 1 still remaining between the stranded metal wires 2 and the outer surface of reinforcing fabric 16 (instead of "the outer surface of the pressure hose member 8", as described in connection with FIG. 1) is removed down to the surface of reinforcing fabric 16, so that the end portions of the stranded metal wires are freely exposed on reinforcing fabric 16.

This leaves reinforcing fabric 16 enclosing and strengthening pressure hose member 8 intact over this end portion of the hose, and this layer of reinforcing fabric 16 is left intact during the following process steps and in the end product, as described above in connection with FIG. 1.

FIG. 4 shows a modified form of the invention. For the purpose of simplifying the description components shown in FIG. 4 and corresponding to components shown in FIGS. 1 to 3 are designated by the same reference numbers as in these already described drawings. On an end portion of one or both ends of the mono-hose 1, outer rubber layer 17 is removed over a length from the end of the hose to the exit area 3 of the control leads to be exposed, thus, the material of outer layer 17 is removed down to the outer surface of the pressure hose member 8 so that stranded metal wires 2 can be peeled out of the embedding material of the mono-hose, and can be insulated and combined into cable 5. A steel connector fitting 13 is inserted at the outer end of hose member 8 and is similar to the steel connector fitting 9 of FIG. 1. An end portion of hose 1, pressure hose member 8 and the steel fitting 13 are enclosed in shrunk-on rubber part 15, also forming a protective cover around the cable.

A preferred process for manufacturing the shaped rubber part of the end portion of the hose and the cable as shown in FIG. 4 is similar to the process for manufacturing the cable and hose connection as described in connection with FIG. 1, at least in the first phase of manufacture.

On at least one end portion of the hose the outer rubber layer embedding stranded metal wires 2 is removed, for example, by abrading off or by peeling it off, until stranded metal wires 2 are freely exposed. Thereafter, stranded metal wire 2 end portions in the form of separate control leads are separately insulated by slipping on and shrinking of a shrink tubing and are combined into a cable comprising the control leads. After the steel connector fitting has been inserted in the end of the pressure hose member, it is provided with a primer coat to prevent an intrusion of moisture—a so-called hidden rusting. In its raw form the rubber-shaped part consists of tapes of unvulcanized rubber, and these tapes are applied in such a manner that they follow the contours of the underlying surface of hose 1 and pressure hose member 8 with the steel connector fitting 13. Accordingly, the cable sleeve or sheath 14 is also prepared. The end portion of hose 1 and pressure hose member 8 with the steel connector fitting, over which the unvulcanized rubber tape has been wound in this manner, is then inserted into a corresponding mold and a final and smooth shape of the shaped part is produced by vulcanization. In this manner, the vulcanized rubber of the tape forms a rubber-to-rubber joint with the hose and a rubber-to-metal joint with the steel connector fitting, so that an extremely secure seating of the steel connector fitting 13 is obtained. During the vulcanization, the rubber of the tape flows into all cavities in the region of the exposed portion of hose member 8 for the pressurized medium, so that the exposed portions of the control leads located on hose member 8 are rigidly secured as far as the region 3 of transition into the original embedding rubber material of the hose.

What is claimed is:
1. A flexible pressure hose comprising:
 a hose member of a flexible material for conveying a pressurized medium;
 an outer layer of flexible material surrounding said hose member;
 a plurality of electrically conductive, stranded metal wires separately embedded in the outer layer of flexible material and extending substantially the length of the hose member, said stranded metal wires extending out of said outer layer at an end area thereof;
 a connector means attached to at least one end of the hose member comprising a first protective cover circumferentially surrounding the hose member in said end area where the stranded metal wires extend out of the outer layer and providing an area for the attachment of the hose member to a passageway for pressurized medium, a second protective cover integral with said first protective cover circumferentially surrounding the stranded metal wires and providing an area for attachment of the stranded metal wires to a means for conducting electric current, a metal connector fitting attached to the end of the hose member and a shrunk-on sleeve within the first protective cover and substantially surrounding the hose member and extending to contact at least a portion of the metal connector fitting.

2. The flexible pressure hose of claim 1, wherein the stranded metal wires are separately embedded in the outer layer of flexible material in a coiled arrangement with the direction of slope of each of the coils changing from one turn to the next.

3. The flexible pressure hose of claim 2, wherein the stranded metal wires extending out of the outer layer of flexible material are combined to form at least one cable member.

4. The flexible pressure hose of claim 3, wherein each of the electrically conductive, stranded metal wires is individually insulated.

5. The flexible pressure hose of claim 4, wherein the protective covers are formed of a shrinkable shaped plastic material.

6. The flexible pressure hose of claim 4, wherein the protective covers are formed of a vulcanizable shaped rubbery material.

7. The flexible pressure hose of claim 2, wherein the stranded metal wires comprise a copper core wire around which steel wire strands are wound.

8. The flexible pressure hose of claim 2, wherein the stranded metal wires comprise copper-plated steel wires.

9. The flexible pressure hose of claim 2, wherein the stranded metal wires extend along the length of the hose member as parallel coils in a sinusoidal arrangement.

10. The flexible pressure hose of claim 9, wherein the hose member comprises a pressure resistant flexible conduit and
 a reinforcing fabric layer surrounding the pressure resistant conduit; and wherein
 an open mesh layer surrounds the reinforcing fabric layer and circumscribes the coiled stranded metal wires embedded in the outer layer of flexible material.

11. The flexible pressure hose of claim 1, wherein the flexible material is a rubbery elastomeric material.

* * * * *